(12) United States Patent
Ji

(10) Patent No.: US 12,519,612 B2
(45) Date of Patent: Jan. 6, 2026

(54) HOMOMORPHIC ENCRYPTION-BASED IMAGE ENCRYPTION AND DECRYPTION METHOD AND DEVICE

(71) Applicant: Deep-In-Sight Co., Ltd., Seongnam-si (KR)

(72) Inventor: Inchan Ji, Seongnam-si (KR)

(73) Assignee: Deep-In Sight Co., Ltd., Seongnam-si (KR)

( * ) Notice: Subject to any disclaimer, the term of this patent is extended or adjusted under 35 U.S.C. 154(b) by 86 days.

(21) Appl. No.: 18/394,419

(22) Filed: Dec. 22, 2023

(65) Prior Publication Data

US 2025/0158799 A1    May 15, 2025

(30) Foreign Application Priority Data

Nov. 10, 2023  (KR) .................. 10-2023-0155506
Dec. 22, 2023  (KR) .................. 10-2023-0190228

(51) Int. Cl.
*H04L 9/00* (2022.01)

(52) U.S. Cl.
CPC .................... *H04L 9/008* (2013.01)

(58) Field of Classification Search
CPC ........................................ H04L 9/008
See application file for complete search history.

(56) References Cited

U.S. PATENT DOCUMENTS

| | | | | |
|---|---|---|---|---|
| 11,121,854 B2* | 9/2021 | Kyakuno | ................ | H04L 9/14 |
| 11,806,882 B1* | 11/2023 | Edwards | ................ | B25J 9/1697 |
| 12,238,197 B2* | 2/2025 | Wade | ................ | H04L 9/3006 |
| 2003/0179925 A1* | 9/2003 | Hsu | ................ | G06T 9/005 |
| | | | | 382/166 |
| 2005/0259844 A1* | 11/2005 | Kot | ................ | G06T 1/0028 |
| | | | | 382/100 |
| 2006/0028495 A1* | 2/2006 | Phan | ................ | G09G 3/2003 |
| | | | | 345/694 |
| 2007/0092102 A1* | 4/2007 | Kot | ................ | H04N 1/32203 |
| | | | | 382/100 |
| 2008/0079748 A1* | 4/2008 | Phan | ................ | H04N 23/84 |
| | | | | 345/589 |
| 2011/0264920 A1* | 10/2011 | Rieffel | ................ | H04L 9/008 |
| | | | | 713/189 |
| 2012/0328095 A1* | 12/2012 | Takahashi | ................ | G09C 5/00 |
| | | | | 380/28 |
| 2014/0355062 A1* | 12/2014 | Sakai | ................ | G06K 15/02 |
| | | | | 358/1.15 |
| 2019/0137339 A1* | 5/2019 | Olson | ................ | G01J 1/08 |

(Continued)

FOREIGN PATENT DOCUMENTS

CN          114996745 A  *  9/2022  ........... H04L 9/0618

*Primary Examiner* — Meng Li
(74) *Attorney, Agent, or Firm* — Umberg Zipser LLP; Ryan Dean

(57) ABSTRACT

Disclosed is a homomorphic encryption-based image encryption method according to some exemplary embodiments of the present disclosure. The method may include: allocating a plurality of pixels included in an image to a plurality of encryption slots according to a predetermined pixel sorting ranking, wherein the predetermined pixel sorting ranking is determined by a row index, a column index, and an RGB channel of a pixel; and performing homomorphic encryption for pixel values of a pixel group allocated to each of the plurality of encryption slots.

12 Claims, 14 Drawing Sheets

(56) References Cited

U.S. PATENT DOCUMENTS

| | | | |
|---|---|---|---|
| 2021/0166345 A1* | 6/2021 | Kim | G06T 3/4053 |
| 2021/0211269 A1* | 7/2021 | Wade | H04L 9/3006 |
| 2022/0230426 A1* | 7/2022 | Kim | G06N 3/04 |
| 2024/0193831 A1* | 6/2024 | Chen | G06T 5/20 |
| 2024/0235809 A1* | 7/2024 | Cheon | H04L 9/08 |
| 2025/0158799 A1* | 5/2025 | Ji | H04L 9/008 |

* cited by examiner

HOMOMORPHIC ENCRYPTION-BASED IMAGE ENCRYPTION AND DECRYPTION METHOD AND DEVICE

CROSS-REFERENCE TO RELATED APPLICATIONS

This application claims priority to and the benefit of Korean Patent Application No. 10-2023-0155506 filed in the Korean Intellectual Property Office on Oct. 10, 2023, the entire contents of which are incorporated herein by reference.

TECHNICAL FIELD

The present disclosure relates to a homomorphic encryption-based image encryption and decryption device.

BACKGROUND ART

Homomorphic encryption can be used for the purpose of storing personal information in an external medium and calculating the personal information while safely protecting the personal information. In the homomorphic encryption, data can be processed while being encrypted in a commercial cloud service while the data is encrypted. The homomorphic encryption is used in a field in which a regulation on personal information protection, such as a medical field to overcome a barrier preventing data sharing and pioneer a new service.

For example, predictive analysis medical care was difficult to be practical because personal medical data protection becomes a problem. Applying the homomorphic encryption to predictive analysis and medical services can eliminate a worry about privacy preservation.

However, the development of technologies that encrypt and decrypt images and videos in addition to a text using the homomorphic encryption is inadequate.

Therefore, there is a demand for a method and a device that can perform homomorphically encrypt and decrypt images.

SUMMARY OF THE INVENTION

The present disclosure is contrived in response to the above background, and has been made in an effort to provide a method and a device that can perform homomorphic encrypting and decrypting an image.

Technical objects of the present disclosure are not restricted to the technical object mentioned as above. Other unmentioned technical objects will be apparently appreciated by those skilled in the art by referencing the following description.

An exemplary embodiment of the present disclosure provides a homomorphic encryption-based image encryption method. The method may include: allocating a plurality of pixels included in an image to a plurality of encryption slots according to a predetermined pixel sorting ranking, wherein the predetermined pixel sorting ranking is determined by a row index, a column index, and an RGB channel of a pixel; and performing homomorphic encryption for pixel values of a pixel group allocated to each of the plurality of encryption slots.

Alternatively, the sequentially allocating of the plurality of pixels included in the image to the plurality of encryption slots according to the predetermined pixel sorting ranking may include sequentially allocating a plurality of pixels corresponding to a first row index and a first RGB channel to the plurality of encryption slots along the first row index, sequentially allocating a plurality of pixels corresponding to a second row index different from the first row index and the first RGB channel to the plurality of encryption slots along the second row index, and sequentially allocating a plurality of pixels corresponding to the first row index and a second RGB channel different from the first RGB channel to the plurality of encryption slots along the first row index.

Alternatively, the allocating of the plurality of pixels included in the image to the plurality of encryption slots according to the predetermined pixel sorting ranking may include allocating a plurality of pixels corresponding to a first column index and the first RGB channel to the plurality of encryption slots along the first column index, allocating a plurality of pixels corresponding to a second column index different from the first column index and the first RGB channel to the plurality of encryption slots along the second column index, and allocating a plurality of pixels corresponding to the first column index and a second RGB channel different from the first RGB channel to the plurality of encryption slots along the first column index.

Alternatively, the allocating of the plurality of pixels included in the image to the plurality of encryption slots according to the predetermined pixel sorting ranking may include sequentially allocating pixels corresponding to a first row and a first column to the plurality of encryption slots while changing an RGB channel, allocating pixels corresponding to a second row different from the first row and the first column to the plurality of encryption slots while changing the RGB channel, and allocating pixels corresponding to the first row and a second column different from the first column to the plurality of encryption slots while changing the RGB channel.

Alternatively, the predetermined pixel sorting ranking for an image including a block having a predetermined size may be determined by using a block sorting order, a row index, a column index, and an RGB channel of a pixel.

Alternatively, the homomorphic encryption-based image encryption method may further include storing homomorphic encryption data including the plurality of encryption slots for which the homomorphic encryption is performed, and header data.

Alternatively, the header data may include pixel sorting ranking information, image format information, image size information, and encryption slot bit number information.

Alternatively, the performing of the homomorphic encryption for the pixel values of the pixel group allocated to each of the plurality of encryption slots may include performing a homomorphic encryption operation for pixel values of the pixel group allocated to two or more encryption slots in parallel.

Alternatively, the homomorphic encryption-based image encryption method may further include determining the number of plurality of encryption slots to be used for the homomorphic encryption of the image based on a resolution or the number of pixels of the image.

Another exemplary embodiment of the present disclosure provides a homomorphic encryption-based image decryption method. The method may include: acquiring header data and a plurality of encryption slots from homomorphic encryption data generated by the homomorphic encryption-based image encryption method of claim 1; performing decryption for homomorphically encrypted pixel values of a pixel group allocated to each of the plurality of encryption slots; and restoring an image by combining the decrypted pixel values of the pixel group based on the header data, wherein the header data includes pixel sorting ranking information, image format information, image size information, and encryption slot bit number information.

Yet another exemplary embodiment of the present disclosure provides a homomorphic encryption-based video encryption method. The method may include: allocating a plurality of pixels included in a first frame of a video to a plurality of encryption slots according to a predetermined pixel sorting ranking, wherein the predetermined pixel sorting ranking is determined by a row index, a column index, and an RGB channel; allocating a plurality of pixels included in a second frame of the video to the plurality of encryption slots according to the predetermined pixel sorting ranking; and performing homomorphic encryption for pixel values of a pixel group allocated to each of the plurality of encryption slots.

Still yet another exemplary embodiment of the present disclosure provides a non-transitory computer readable storage storing a computer program. The computer program includes instructions for causing one or more processors to perform a homomorphic encryption-based image encryption method, and the method may include: allocating a plurality of pixels included in an image to a plurality of encryption slots according to a predetermined pixel sorting ranking, wherein the predetermined pixel sorting ranking is determined by a row index, a column index, and an RGB channel of a pixel; and performing homomorphic encryption for pixel values of a pixel group allocated to each of the plurality of encryption slots.

Still yet exemplary embodiment of the present disclosure provides a computing device performing a homomorphic encryption-based image encryption method. The computing device may include: a memory including computer-executable components; and a processor executing following computer-executable components stored in the memory, and the processor may be configured to allocate a plurality of pixels included in an image to a plurality of encryption slots according to a predetermined pixel sorting ranking, wherein the predetermined pixel sorting ranking is determined by a row index, a column index, and an RGB channel of a pixel, and perform homomorphic encryption for pixel values of a pixel group allocated to each of the plurality of encryption slots.

Technical solving means which can be obtained in the present disclosure are not limited to the aforementioned solving means and other unmentioned solving means will be clearly understood by those skilled in the art from the following description.

According to an exemplary embodiment of the present disclosure, a method and a device of homomorphic encryption and decryption of an image can be provided.

Effects which can be acquired in the present disclosure are not limited to the aforementioned effects and other unmentioned effects will be clearly understood by those skilled in the art from the following description.

BRIEF DESCRIPTION OF THE DRAWINGS

Various aspects are now described with reference to the drawings and like reference numerals are generally used to designate like elements. In the following exemplary embodiments, for the purpose of description, multiple specific detailed matters are presented to provide general understanding of one or more aspects. However, it will be apparent that the aspect(s) can be executed without the detailed matters.

DETAILED DESCRIPTION

Figure 1:
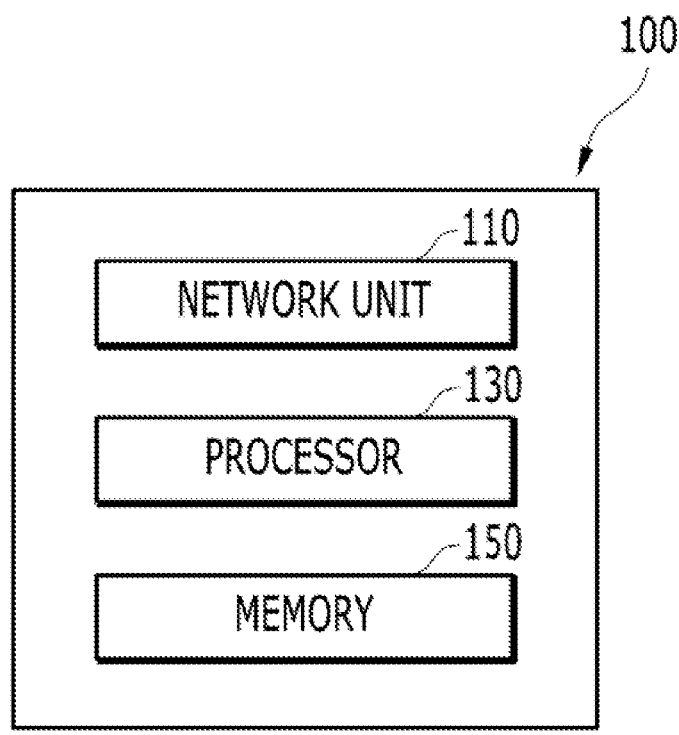
FIG. 1 is a block diagram of a computing device for performing homomorphic encryption-based image encryption and decryption according to some exemplary embodiments of the present disclosure.

Various exemplary embodiments and/or aspects will be now disclosed with reference to drawings. In the following description, for the purpose of a description, multiple detailed matters will be disclosed in order to help comprehensive appreciation of one or more aspects. However, those skilled in the art of the present disclosure will recognize that the aspect(s) can be executed without the detailed matters. In the following disclosure and the accompanying drawings, specific exemplary aspects of one or more aspects will be described in detail. However, the aspects are exemplary and some of various methods in principles of various aspects may be used and the descriptions are intended to include all of the aspects and equivalents thereof. Specifically, in "embodiment", "example", "aspect", "illustration", and the like used in the specification, it may not be construed that a predetermined aspect or design which is described is more excellent or advantageous than other aspects or designs.

Hereinafter, like reference numerals refer to like or similar elements regardless of reference numerals and a duplicated description thereof will be omitted. Further, in describing an exemplary embodiment disclosed in the present disclosure, a detailed description of related known technologies will be omitted if it is determined that the detailed description makes the gist of the exemplary embodiment of the present disclosure unclear. Further, the accompanying drawings are only for easily understanding the exemplary embodiment disclosed in this specification and the technical spirit disclosed by this specification is not limited by the accompanying drawings.

The terminology used in this specification is for the purpose of describing embodiments only and is not intended to limit the present disclosure. In this specification, the singular form also includes the plural form, unless the context indicates otherwise. It is to be understood that the terms "comprise" and/or "comprising" used in the specification does not exclude the presence or addition of one or more other components other than stated components.

Although the terms "first", "second", and the like are used for describing various elements or components, these elements or components are not confined by these terms, of course. These terms are merely used for distinguishing one element or component from another element or component. Therefore, a first element or component to be mentioned below may be a second element or component in a technical spirit of the present disclosure.

Unless otherwise defined, all terms (including technical and scientific terms) used in the present specification may be used as the meaning which may be commonly understood by the person with ordinary skill in the art, to which the present disclosure pertains. Terms defined in commonly used dictionaries should not be interpreted in an idealized or excessive sense unless expressly and specifically defined.

Moreover, the term "or" is intended to mean not exclusive "or" but inclusive "or". That is, when not separately specified or not clear in terms of a context, a sentence "X uses A or B" is intended to mean one of the natural inclusive replacements. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

In addition, the term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, constitutions, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In addition, the term "etc" such as "A, B, etc." should be interpreted to mean "a case including only A", "a case including only B", and "a case in which A and B are combined".

The objects and effects of the present disclosure, and technical constitutions for accomplishing these will become obvious with reference to exemplary embodiments to be described below in detail along with the accompanying drawings. In describing the present disclosure, a detailed description of known function or constitutions will be omitted if it is determined that it unnecessarily makes the gist of the present disclosure unclear. In addition, terms to be described below as terms which are defined in consideration of functions in the present disclosure may vary depending on the intention of a user or an operator or usual practice.

However, the present disclosure is not limited to exemplary embodiments disclosed below but may be implemented in various different forms. However, the exemplary embodiments are provided to make the present disclosure be complete and completely announce the scope of the present disclosure to those skilled in the art to which the present disclosure belongs and the present disclosure is just defined by the scope of the claims. Accordingly, the terms need to be defined based on contents throughout this specification.

FIG. 1 is a block diagram of a computing device for performing homomorphic encryption-based image encryption and decryption according to some exemplary embodiments of the present disclosure.

As illustrated in FIG. 1, the computing device 100 may include a processor 110, a memory 130, and a network unit 150. A configuration of the computing device 100 illustrated in FIG. 1 is only an example shown through simplification. In some exemplary embodiments of the present disclosure, the computing device 100 may include other components for performing a computing configuration of the computing device 100 and only some of the disclosed components may constitute the computing device 100.

The processor 110 may be constituted by one or more cores and may include processors for data analysis and processing, and deep learning, which include a central processing unit (CPU), a general purpose graphics processing unit (GPGPU), a tensor processing unit (TPU), and the like of the computing device. The processor 110 may read a computer program stored in the memory 130 to perform data conversion, operation, generation, etc., for performing homomorphic encryption-based image encryption and decryption according to some exemplary embodiments of the present disclosure. For example, the processor 110 may perform steps for performing the homomorphic encryption-based image encryption and decryption described below. Further, the processor 110 may read a computer program stored in the memory 130 to perform data conversion, operation, generation, etc., for performing homomorphic encryption-based video encryption and decryption according to some exemplary embodiments of the present disclosure. Further, according to some exemplary embodiments of the present disclosure, the processor 110 may perform an operation for training a neural network by using training data in order to perform a homomorphic encryption-based image encryption and decryption method. The processor 110 may perform calculations for learning the neural network, which include processing of input data for learning in deep learning (DL), extracting a feature in the input data, calculating an error, updating a weight of the neural network using backpropagation, and the like. At least one of the CPU, the GPGPU, and the TPU of the processor 110 may process an operation for the homomorphic encryption-based image encryption and decryption. For example, both the CPU and the GPGPU may jointly process an operation for the homomorphic encryption-based image encryption and decryption method. Further, in some exemplary embodiments of the present disclosure, processors of a plurality of computing devices may be used together to process data conversion, operation, and generation for the homomorphic encryption-based image encryption and decryption method, the learning of the network function and the data classification using the network function. Further, the computer program executed in the computing device according to some exemplary embodiments of the present disclosure may be a CPU, GPGPU, or TPU executable program.

According to some exemplary embodiments of the present disclosure, the memory 130 may store any type of information generated or determined by the processor 110 or any type of information received by the network unit 150. For example, the memory 130 may store data generated in the process of performing the homomorphic encryption-based image encryption and decryption method by the processor 110. Further, the memory 130 may store data received from the outside in the process of performing the homomorphic encryption-based image encryption and decryption method by the processor 110. For example, the memory 130 may store image data homomorphically encrypted through the homomorphic encryption-based image encryption method, and homomorphic encryption data. Further, the memory 130 may store the homomorphic encryption data decrypted through the homomorphic encryption-based image decryption method, and decrypted image data. However, the present disclosure is not limited thereto, and the memory 130 may store various information for performing the homomorphic encryption-based image encryption and decryption method according to some exemplary embodiments of the present disclosure.

According to some exemplary embodiments of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to some exemplary embodiments of the present disclosure may use an arbitrary type of known wired/wireless communication system.

The network unit 150 may transmit and receive information processed by the processor 110, a user interface, and the like through communication with other terminals. For example, the network unit 150 may provide the user interface generated by the processor 110 to a client (e.g., a user terminal). In addition, the network unit 150 may receive an external input of a user applied to a client and transfer the external input to the processor 110. In this case, the processor 110 may process operations such as outputting, correcting, changing, adding, and the like of information provided through the user interface based on the external input of the user received from the network unit 150.

Specifically, for example, the network unit 150 may transmit and receive various information for performing the homomorphic encryption-based image encryption and decryption method according to some exemplary embodiments of the present disclosure. For example, the network unit 150 may receive image data or video data stored in a database. Further, the network unit 150 may externally transmit some data generated in the process of performing the homomorphic encryption-based image encryption and decryption method described below to be stored in the database.

Meanwhile, according to some exemplary embodiments of the present disclosure, the computing device 100 may include a server as a computing system that transmits and receives information through communication with the client. In this case, the client may be any type of terminal which may access the server. For example, the computing device 100 which is the server may receive a query from a user terminal and generate a single information processing result corresponding to the query. In this case, the computing device 100 which is the server may provide, to the user terminal, a user interface including the processing result. At this time, the user terminal may output the user interface received from the computing device 100 as the server, and receive or process information through interaction with the user.

In an additional exemplary embodiment, the computing device 100 may also include any type of terminal that receives data resources generated by an arbitrary server and performs additional information processing.

Figure 2:
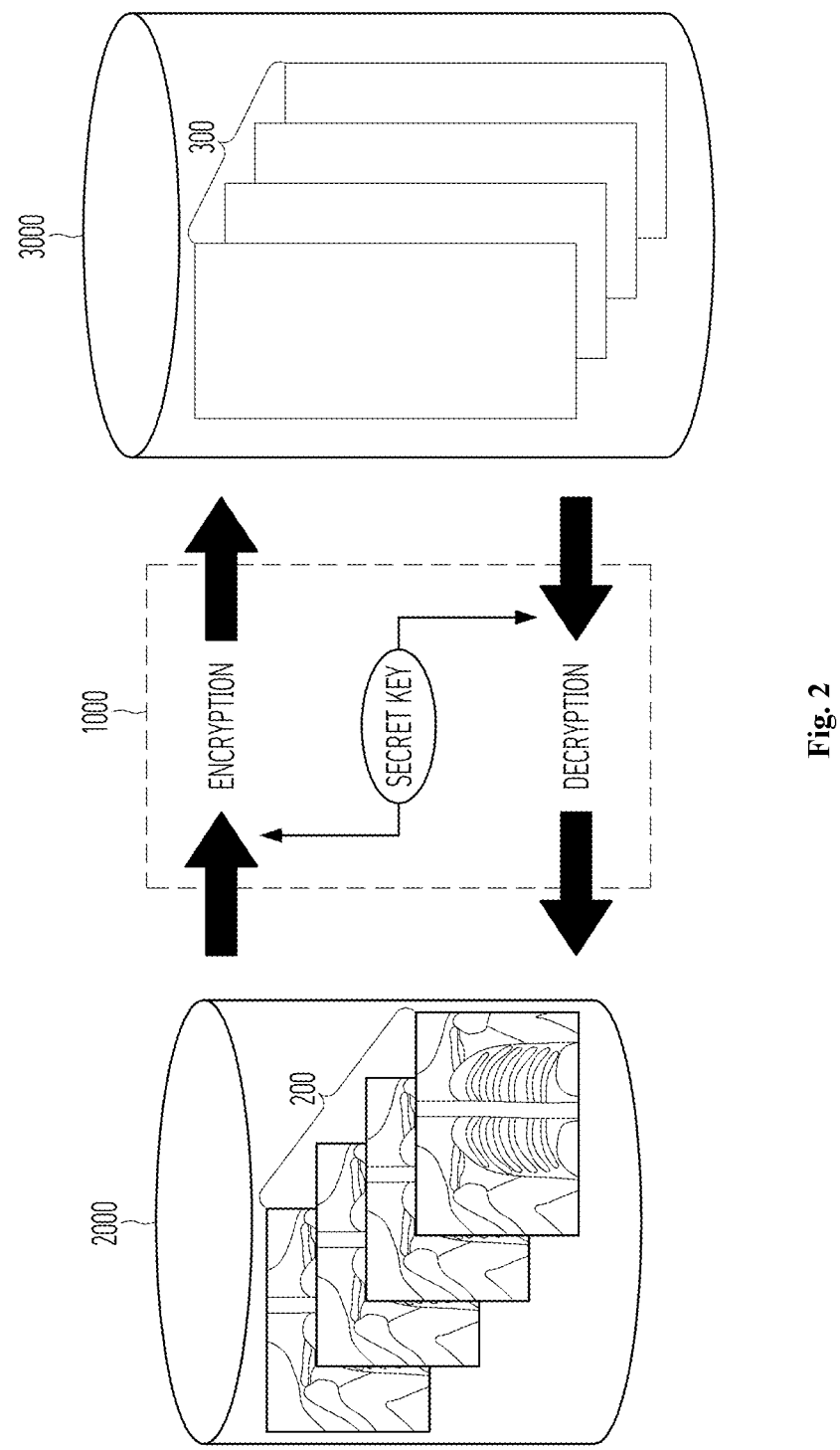
FIG. 2 is a schematic view of a homomorphic encryption-based image encryption and decryption system 1000 according to some exemplary embodiments of the present disclosure.

FIG. 2 is a schematic view of a homomorphic encryption-based image encryption and decryption system 1000 according to some exemplary embodiments of the present disclosure.

In some examples, the homomorphic encryption-based image encryption and decryption system 1000 homomorphically encrypts image data 200 stored in an image storage 2000 to generate homomorphic encryption data 300. Further, the homomorphic encryption-based image encryption and decryption system 1000 decrypts homomorphic encryption data 300 stored in a homomorphic encryption data storage 3000 to restore image data 200.

In some examples, homomorphic encryption may mean an encryption scheme configured to perform various computations while encrypting data. A result of a computation using the homomorphic encryption data 300 may become new homomorphic encryption data 300, and decryption data (plaintext or original text) acquired by decrypting the homomorphic encryption data 300 may be the same as a computation result of original data before encryption. The homomorphic encryption data 300 may be referred to as encrypted data or ciphertext. The homomorphic encryption data 300 may have a form of a polynomial or a vector including the polynomial. In some examples, the homomorphic encryption-based image encryption and decryption system 1000 may be implemented by using a homomorphic encryption algorithm such as Brakerski, Gentry, and Vaikuntanathan (BGV), Brakerski, Fan, and Vercauteren (BFV), Cheon, Kim, Kim and Song (CKKS), etc.

The homomorphic encryption-based image encryption and decryption system 1000 may perform a process of encrypting or decrypting image input data in Privacy Preserving Machine Learning (PPML) and an application service.

The homomorphic encryption-based image encryption and decryption system 1000 according to the present disclosure may provide a function of encrypting an image based on the homomorphic encryption to enable only a specific person possessing a secret key to decrypt an image. Further, since the homomorphic encryption-based image encryption and decryption system 1000 according to the present disclosure encrypts an image by using a plurality of encryption slots, the homomorphic encryption-based image encryption and decryption system 1000 may implement parallelization of computation.

Figure 3:
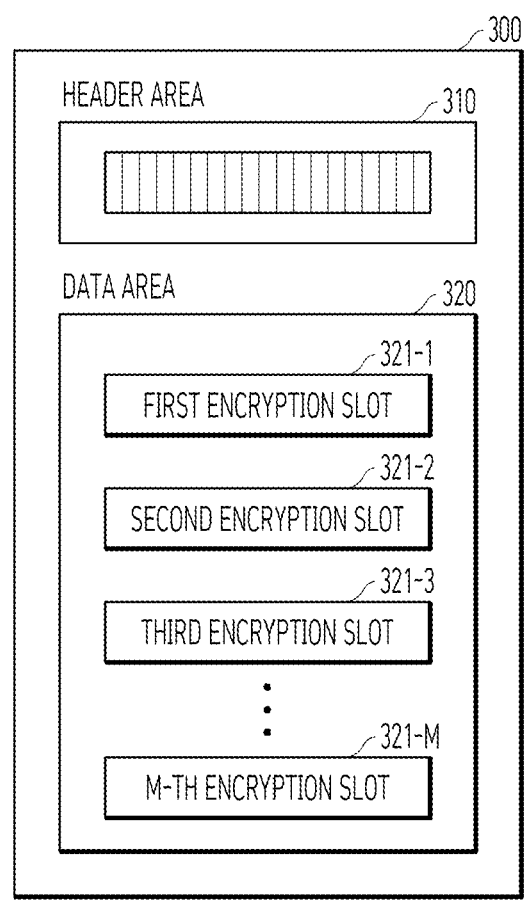
FIG. 3 illustrates exemplary homomorphic encryption data according to some exemplary embodiments of the present disclosure.
Figure 4:
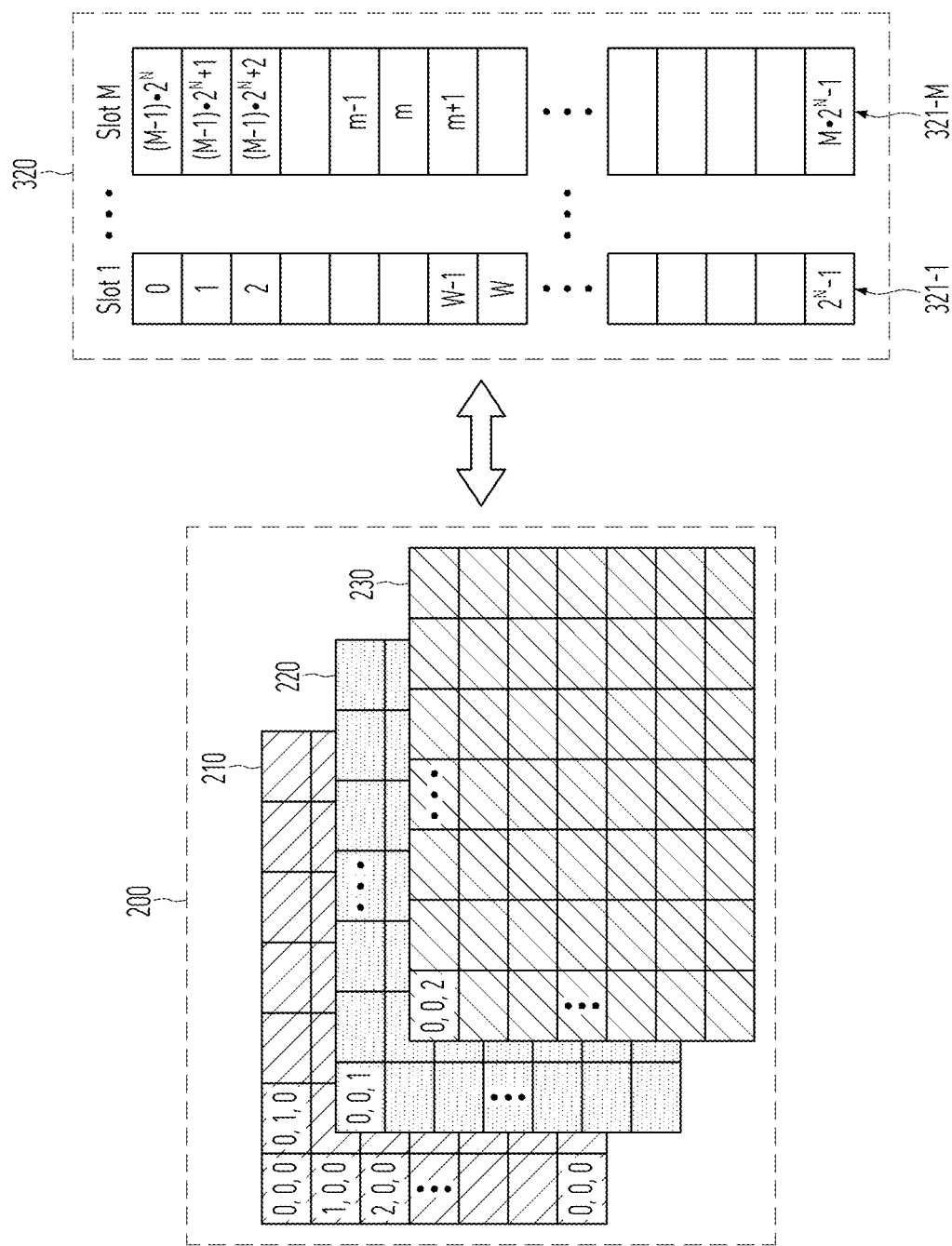
FIG. 4 is a diagram for describing a plurality of encryption slots according to some exemplary embodiments of the present disclosure.

FIG. 3 illustrates exemplary homomorphic encryption data 300 according to some exemplary embodiments of the present disclosure. FIG. 4 is a diagram for describing a plurality of encryption slots according to some exemplary embodiments of the present disclosure.

According to some exemplary embodiments of the present disclosure, the homomorphic encryption data 300 may be constituted by a header area including header data 310 and a data area including a plurality of encryption slots 320. The header data 310 may include information for decrypting encrypted image data. In some examples, the header data 310 may include pixel sorting ranking information, image format information, image size information, and encryption slot bit number information. However, the present disclosure is not limited thereto, and the header data 310 may include additional information on image data.

The pixel sorting ranking information may information for defining a pixel sorting ranking of allocating a plurality of pixels of an image to the plurality of encryption slots. In some examples, the pixel sorting ranking may be determined by using a row index, a column index, and an RGB channel of the pixel.

Referring to FIG. 4, a pixel location and a pixel value in the image may be defined as follows.

$$P_{i,j,k} = S_m \quad \text{[Equation 1]}$$

Where $P_{i,j,k}$ may mean the pixel location. Where 'i' may mean the row index. '0≤i<H', and where 'H' may mean a height of the image. 'j' may mean the column index. The column index may have a value of '0≤j<W', and where 'W' may mean a width of the image.

'k' may mean the RGB channel. For example, in the case of an RGB image, 'k' may have three values indicating red, green, and blue. As another example, in the case of an RGBA image, 'k' may have four values indicating red, green, blue, and alpha.

'$S_m$' may mean the pixel value. For example, in the case of an 8-bit image, '$S_m$' may have a value of 0 to 255. As another example, in the case of an 16-bit image, '$S_m$' may have a value of 0 to 65535. 'm' may have a value for distinguishing each pixel among all pixels included in the image. 'm' may be determined by an order in which the pixels are allocated according to the pixel sorting ranking. In other words, 'm' may mean an order of the pixels allocated according to the pixel sorting ranking information. Therefore, 'm' may be used for identifying an encryption slot storing data for the corresponding pixel among the plurality of encryption slots jointly with information on a size of the encryption slot.

In some examples, the pixel sorting ranking may mean a criterion for allocating the pixels of the image to the plurality of encryption slots 320 according to ranking of the row index, the column index, and the RGB channels. For example, when the pixel sorting ranking is the row index, column index, and RGB channel orders, the homomorphic encryption-based image encryption and decryption system 1000 may allocate the pixels of the image to the plurality of encryption slots 320 sequentially according to the row index for each column. In this case, when the pixels of the image is allocated to any one encryption slot as large as a total number bit ($2^n$) of the encryption slot, the homomorphic encryption-based image encryption and decryption system 1000 may allocate the remaining pixels of the image to another encryption slot among the plurality of encryption slots 320. For example, after all pixels included in an 'RED' RGB channel image 210 are allocated, the homomorphic encryption-based image encryption and decryption system 1000 may allocate the pixels of the image to the plurality of encryption slots 320 sequentially according to the row index for each column in another 'BLUE' RGB channel image 220. The homomorphic encryption-based image encryption and decryption system 1000 may repeat such an operation until all pixels included in the image are allocated to the plurality of encryption slots 320. However, the present disclosure is not limited thereto, and the homomorphic encryption-based image encryption and decryption system 1000 may allocate the pixels of the image to the plurality of encryption slots 320 according to various pixel sorting rankings. Exemplary embodiments of allocating the pixels of the image to the plurality of encryption slots 320 will be described in detail with reference to FIGS. 5 to 8.

In some examples, the homomorphic encryption-based image encryption and decryption system 1000 may determine the number of plurality of encryption slots 320 to be used for homomorphic encryption of the image based on a resolution or the number of pixels of the image. When specifically described, for example, the plurality of encryption slots may have cells of a predetermined bit number ($2^n$), which may store data. Accordingly, since data acquired by decrypting the image may exceed cells of a bit number which may be stored in one encryption slot, the homomorphic encryption-based image encryption and decryption system 1000 may determine the number of encryption slots 320 to be used for the homomorphic encryption of the image by using the resolution or the number of the pixels of the image. For example, the homomorphic encryption-based image encryption and decryption system 1000 may calculate a total bit number required for encrypting the image by using the resolution or the number of pixels of the image. In addition, the homomorphic encryption-based image encryption and decryption system 1000 compares cells of a bit number which is enabled to be stored in the encryption slot with the total bit number to determine the number of encryption slots to be used for the homomorphic encryption of the image. However, although is not limited thereto, the number of encryption slots may be determined by various schemes.

When all pixels of the image are allocated to the plurality of encryption slots 320, the homomorphic encryption-based image encryption and decryption system 1000 may perform the homomorphic encryption for a pixel value for a pixel group allocated to each of the plurality of encryption slots 320. When the homomorphic encryption is performed, the plurality of encryption slots 320 are used, so the homomorphic encryption-based image encryption and decryption system 1000 may perform a homomorphic encryption operation for pixel values of the pixel group allocated to two or more encryption slots in parallel. In the same principle, the homomorphic encryption-based image encryption and decryption system 1000 may perform the homogeneous decryption operation for two or more encryption slots in parallel. Therefore, the homomorphic encryption-based image encryption and decryption system 1000 may provide rapid encryption and decryption for the image through parallelization of the operation.

After performing the homomorphic encryption, the homomorphic encryption-based image encryption and decryption system 1000 may store the homomorphic encryption data 300 including the plurality of encryption slots for which the homomorphic encryption is performed, and the header data 310. The homomorphic encryption data 300 may be used to restore the image data 200 again through decryption in the future.

When the decryption is described, the homomorphic encryption-based image encryption and decryption system 1000 may acquire the header data 310 and the plurality of encryption slots 320 from the homomorphic encryption data 300 generated by the homomorphic encryption-based image encryption method. In addition, the homomorphic encryption-based image encryption and decryption system 1000 may perform decryption for the homomorphically encrypted pixel values of the pixel group allocated to the plurality of respective encryption slots 320. In this case, the homomorphic encryption-based image encryption and decryption system 1000 may perform the homogeneous decryption operation for two or more encryption slots in parallel.

When the homomorphic decryption operation is completed wholly or partially, the homomorphic encryption-based image encryption and decryption system 1000 may restore the image by using the decrypted pixel value of the pixel group based on the header data 310. In some examples, the header data 310 may include pixel sorting ranking information, image format information, image size information, and encryption slot bit number information. For example, the image encryption and decryption system 1000 may identify a height and a width of the image included in the image size information. In addition, the image encryption and decryption system 1000 may identify a format (JPEG, etc.) of the image, the number of RGB channels, a range of the pixel value, etc., by using the format information of the image. In addition, the image encryption and decryption system 1000 may identify which of pixel of pixel values in the image decrypted pixel values of any one pixel group are by using the pixel sorting ranking information and the number of encryption slot bits. Therefore, the homomorphic encryption-based image encryption and decryption system 1000 combines the decrypted pixel values of the pixel group by using the header data 310 to restore the image. However, the present disclosure is not limited thereto, and the homomorphic encryption-based image encryption and decryption system 1000 may restore the image by using the decrypted pixel values by various schemes.

An exemplary embodiment in which the homomorphic encryption-based image encryption and decryption system 1000 may perform both encryption and decryption is described. In some exemplary embodiments, the homomorphic encryption-based image encryption and decryption system 1000 may be implemented to perform only one function of the encryption or the decryption.

Figure 5:
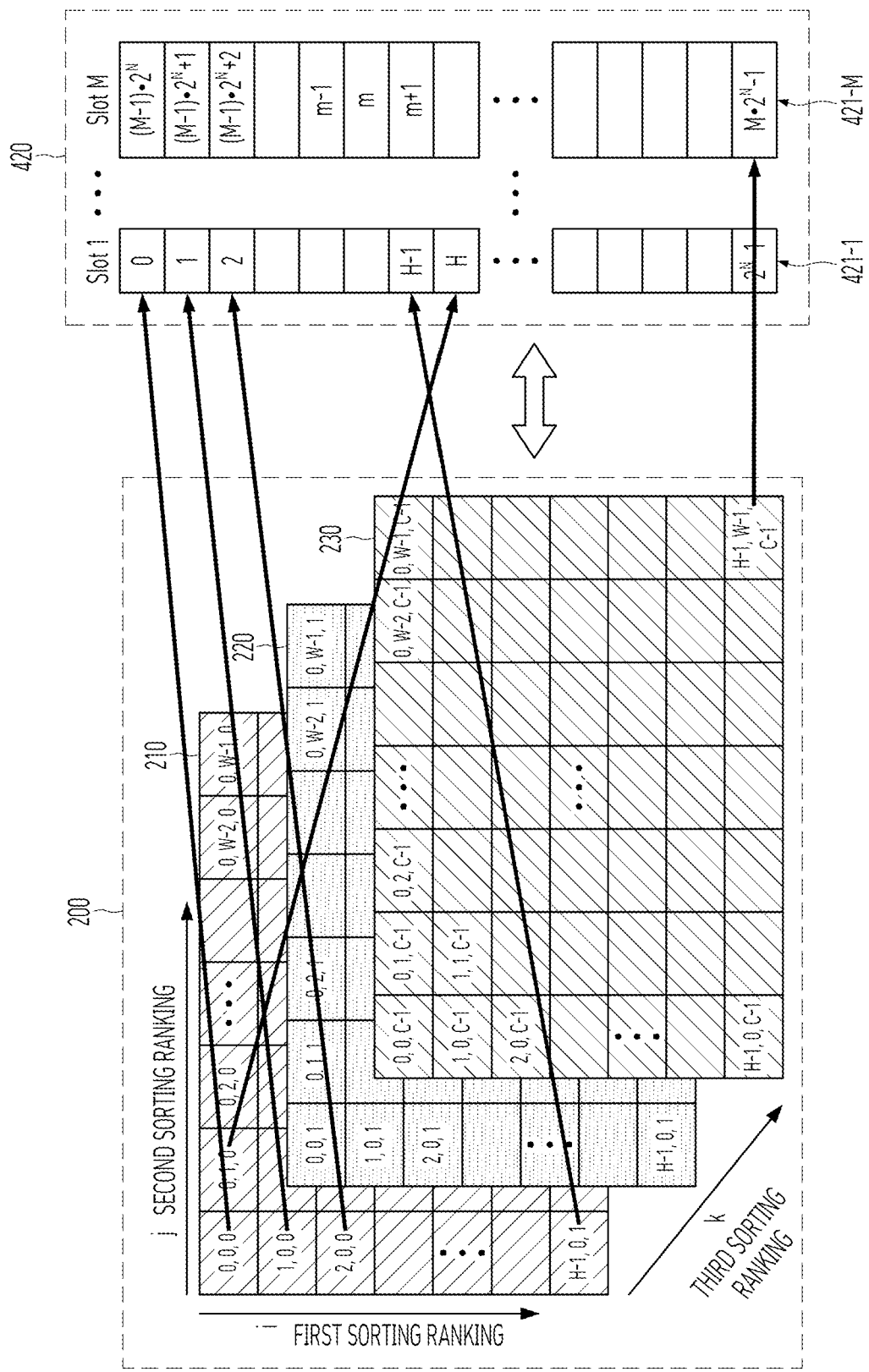
FIG. 5 is a diagram for describing an exemplary embodiment of allocating a plurality of pixels included in an image to a plurality of encryption slots according to a predetermined pixel sorting ranking according to some exemplary embodiments of the present disclosure.
Figure 6:
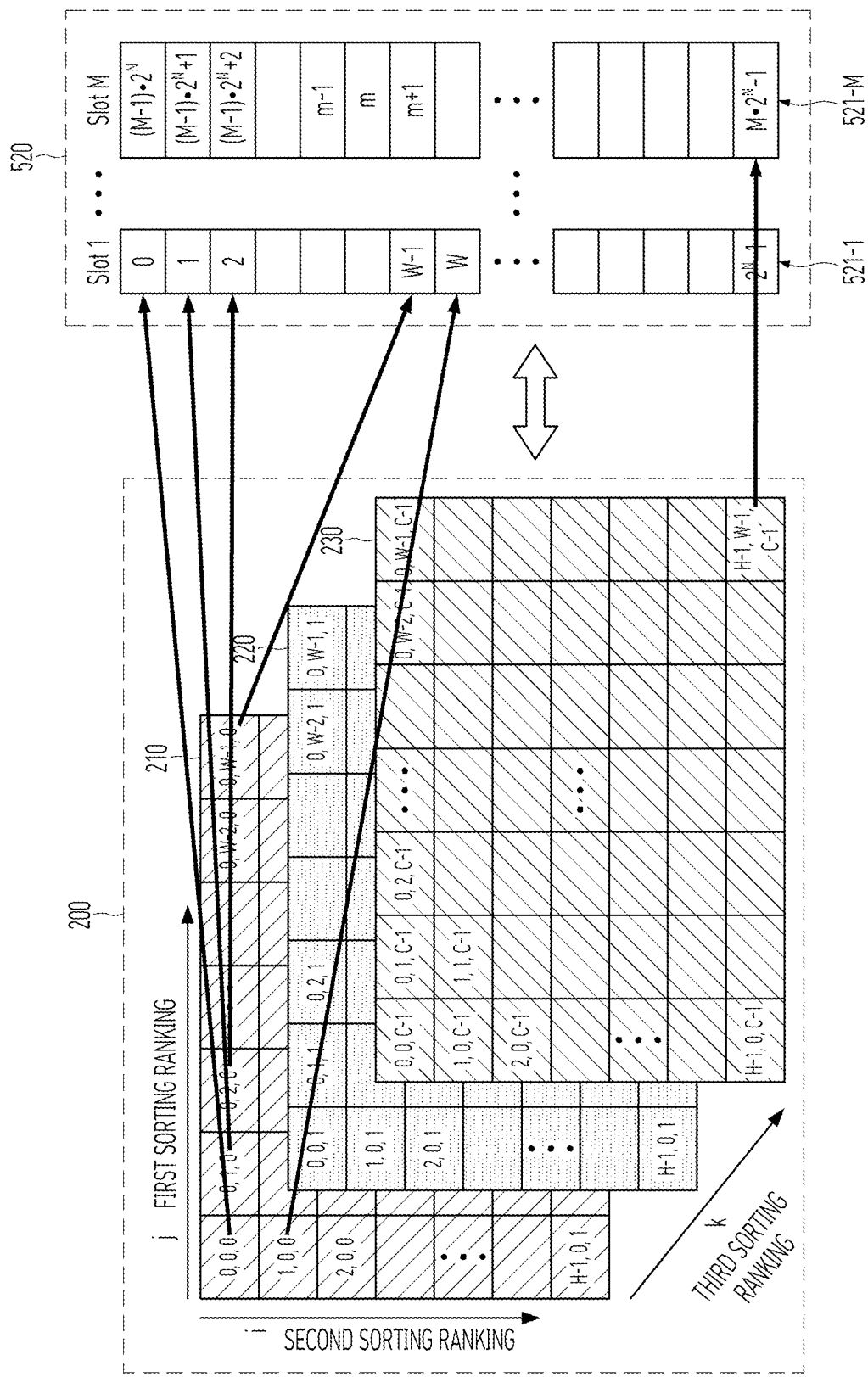
FIG. 6 is another diagram for describing an exemplary embodiment of allocating a plurality of pixels included in an image to a plurality of encryption slots according to a predetermined pixel sorting ranking according to some exemplary embodiments of the present disclosure.
Figure 7:
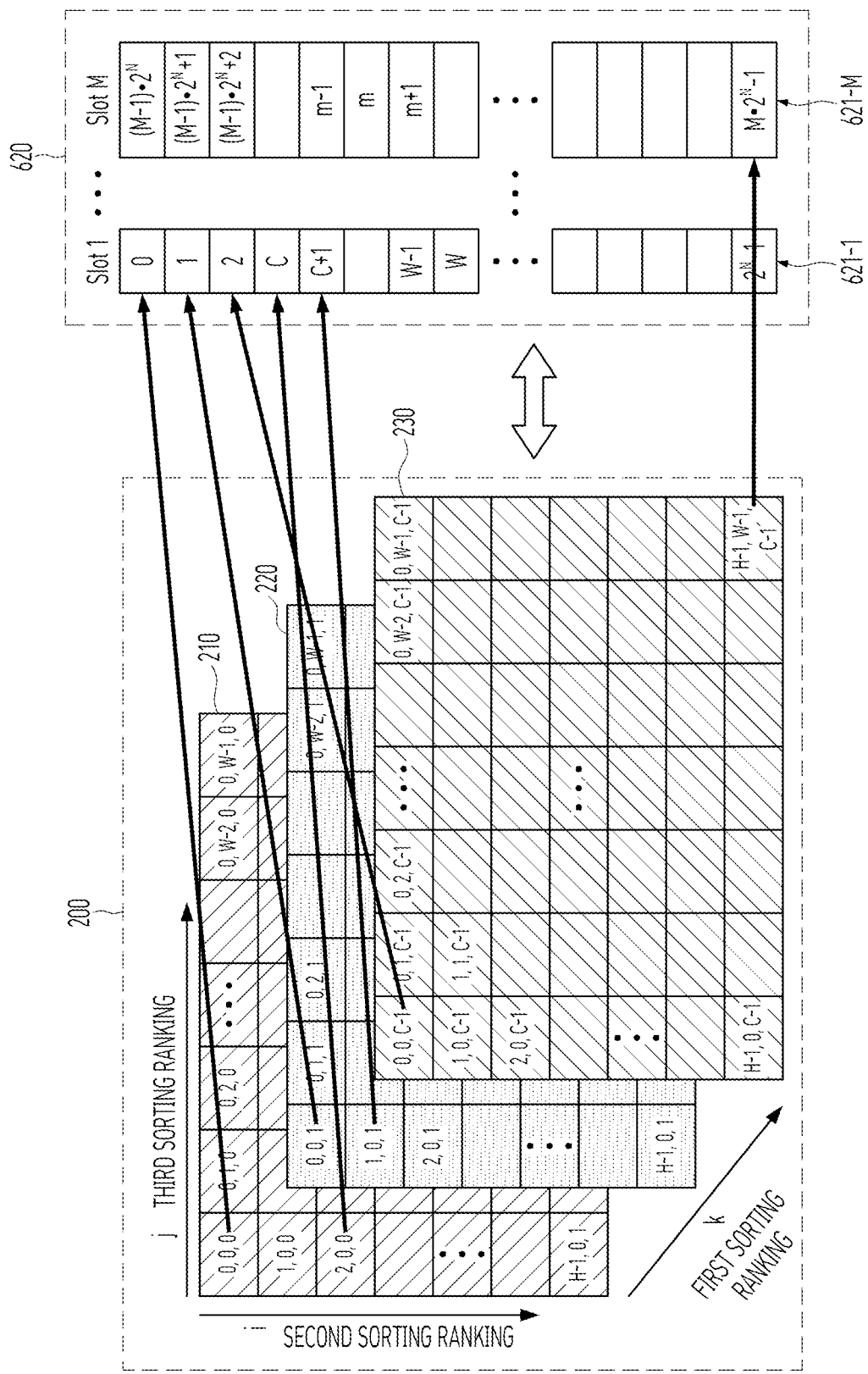
FIG. 7 is yet another diagram for describing an exemplary embodiment of allocating a plurality of pixels included in an image to a plurality of encryption slots according to a predetermined pixel sorting ranking according to some exemplary embodiments of the present disclosure.

FIG. 5 is a diagram for describing an exemplary embodiment of allocating a plurality of pixels included in an image to a plurality of encryption slots according to a predetermined pixel sorting ranking according to some exemplary embodiments of the present disclosure. FIG. 6 is another diagram for describing an exemplary embodiment of allocating a plurality of pixels included in an image to a plurality of encryption slots according to a predetermined pixel sorting ranking according to some exemplary embodiments of the present disclosure. FIG. 7 is yet another diagram for describing an exemplary embodiment of allocating a plurality of pixels included in an image to a plurality of encryption slots according to a predetermined pixel sorting ranking according to some exemplary embodiments of the present disclosure.

FIG. 5 illustrates an example in which a predetermined pixel sorting ranking is the row index, column index, and RGB channel order. In this case, the homomorphic encryption-based image encryption and decryption system 1000 may sequentially allocate pixels to encryption slots along the row index, and then sequentially allocate pixels to a plurality of encryption slots 420 along the row index again while sequentially changing the column index and the RGB channel.

Specifically, when the predetermined pixel sorting ranking is the row index, column index, and RGB channel order, the homomorphic encryption-based image encryption and decryption system 1000 may allocate a plurality of pixels corresponding to a first row index and a first RGB channel to the plurality of encryption slots 420 along the first row index. For example, when the first row index is a first row index of the image, and the first RGB channel is 'k=0', the homomorphic encryption-based image encryption and decryption system 1000 may allocate a plurality of pixels (i.e. pixels '$P_{i,0,0}$') corresponding to the first row index and the first RGB channel to the plurality of encryption slots 420 along the first row index. Specifically, the homomorphic encryption-based image encryption and decryption system 1000 may allocate a pixel value of '$P_{0,0,0}$' to 'cell 0' of slot 1 421-1, allocate a pixel value of '$P_{1,0,0}$' to 'cell 1' of slot 1 421-1, and allocate a pixel value of '$P_{2,0,0}$' to 'cell 2' of slot 1 421-1.

After allocating a last pixel '$P_{H-1,0,0}$' in the first row index to a plurality of encryption slots 520, the homomorphic encryption-based image encryption and decryption system 1000 may allocate a plurality of pixels corresponding to a second row index different from the first row index, and the first RGB channel to a plurality of encryption slots along the second row index. Specifically, the homomorphic encryption-based image encryption and decryption system 1000 may allocate the last pixel '$P_{H-1,0,0}$' in the first row index to the plurality of encryption slots 520, and then allocate a pixel '$P_{0,1,0}$' to 'cell H' of 'slot 1' 421-1 along the second row index which is a second row index. As described above, when the pixels of the image are allocated to cells of a total bit number ($2^n$) of the first encryption slot 421-1, the remaining pixels of the image may be allocated to a different second encryption slot.

When a plurality of pixels (i.e., pixels of the image 210) corresponding to the first RGB channel are all allocated by such a scheme, the homomorphic encryption-based image encryption and decryption system 1000 may repeat the pixel allocation scheme by changing the RGB channel. For example, the homomorphic encryption-based image encryption and decryption system 1000 may allocate all pixels of the image 210 of the first RGB channel to the plurality of encryption slots 420 by the scheme, and then allocate a plurality of pixels (i.e., pixels '$P_{i,0,1}$') corresponding to the first row index, and the second RGB channel different from the first RGB channel to the plurality of encryption slots 420. Specifically, for example, the homomorphic encryption-based image encryption and decryption system 1000 may allocate, to the plurality of encryption slots 420, a last pixel '$P_{H-1,W-1,0}$' of a last row index in the image 210 of the RGB channel with 'k=0' according to the scheme, and then sequentially allocate, to the plurality of encryption slots 420, a pixel value of '$P_{0,0,1}$' and a pixel value of '$P_{1,0,1}$' of the image 210 of the first RGB channel of an image 220 of the RGB channel with 'k=1'. By such a scheme, the homomorphic encryption-based image encryption and decryption system 1000 may repeat the steps until allocation for a last pixel '$P_{H-1,W-1,C-1}$' is sequentially completed according to the pixel sorting ranking which is the row index, column index, and RGB channel value order.

Pixel locations and pixel values of the pixels allocated according to the pixel sorting ranking information which is the row index, column index, and RGB channel value order described in FIG. 5 are expressed as in the following equation.

$$P_{i,j,k} = S_m, \text{ where } m = i + j \times H + k \times W \times H \quad \text{[Equation 2]}$$

FIG. 6 illustrates an example in which a predetermined pixel sorting ranking is the column index, row index, and RGB channel order. In this case, the homomorphic encryption-based image encryption and decryption system 1000 may allocate the pixels to encryption slots along the column index, and then allocate the pixels to the plurality of encryption slots 520 along the column index again while sequentially changing the row index and the RGB channel.

Specifically, when the predetermined pixel sorting ranking is the column index, row index, and RGB channel order, the homomorphic encryption-based image encryption and decryption system 1000 may allocate a plurality of pixels corresponding to a first column index and the first RGB channel to the plurality of encryption slots 520 along the first column index. For example, when the first column index is a first column index of the image, and the first RGB channel is 'k=0', the homomorphic encryption-based image encryption and decryption system 1000 may allocate, to the plurality of encryption slots 520, a plurality of pixels (i.e. pixels '$P_{0,j,0}$') corresponding to the first column index and the first RGB channel along the first column index. Specifically, the homomorphic encryption-based image encryption and decryption system 1000 may allocate a pixel value of '$P_{0,0,0}$' to 'cell 0' of slot 1 521-1, allocate a pixel value of '$P_{0,1,0}$' to 'cell 1' of slot 1 521-1, and allocate a pixel value of '$P_{0,2,0}$' to 'cell 2' of slot 1 521-1.

After allocating a last pixel '$P_{0,W-1,0}$' in the first column index to the plurality of encryption slots 520, the homomorphic encryption-based image encryption and decryption system 1000 may sequentially allocate a plurality of pixels corresponding to a second column index different from the first column index, and the first RGB channel to a plurality of encryption slots 520 along the second column index.

Specifically, the homomorphic encryption-based image encryption and decryption system 1000 may allocate the last pixel '$P_{0,W-1,0}$' in the first column index to the plurality of encryption slots 520, and then allocate a pixel '$P_{1,0,0}$' to 'cell H' of 'slot 1' 521-1 along the second column index which is a second column index. As described above, when the pixels of the image are allocated to cells of a total bit number ($2^n$) of the first encryption slot 521-1, the remaining pixels of the image may be allocated to a different second encryption slot.

When a plurality of pixels (i.e., pixels of the image 210) corresponding to the first RGB channel are all allocated by such a scheme, the homomorphic encryption-based image encryption and decryption system 1000 may repeat the pixel allocation scheme by changing the RGB channel. For example, the homomorphic encryption-based image encryption and decryption system 1000 may allocate all pixels of the image 210 of the first RGB channel to the plurality of encryption slots 520 by the scheme, and then allocate a plurality of pixels (i.e., pixels '$P_{0,j,1}$') corresponding to the first column index, and the second RGB channel different from the first RGB channel to the plurality of encryption slots 520. Specifically, for example, the homomorphic encryption-based image encryption and decryption system 1000 may allocate, to the plurality of encryption slots 520, a last pixel '$P_{H-1,W-1,0}$' in a last column index in the image 210 of the RGB channel with 'k=0' according to the scheme, and then sequentially allocate, to the plurality of encryption slots 520, a pixel value of '$P_{0,0,1}$' and a pixel value of '$P_{0,1,1}$' of the image 210 of the first RGB channel of an image 220 of the RGB channel with 'k=1'. By such a scheme, the homomorphic encryption-based image encryption and decryption system 1000 may repeat the steps until allocation for a last pixel '$P_{H-1,W-1,C-1}$' is sequentially completed according to the pixel sorting ranking which is the column index, row index, and RGB channel value order.

Pixel locations and pixel values of the pixels allocated according to the pixel sorting ranking information which is the column index, row index, and RGB channel value order described in FIG. 6 are expressed as in the following equation.

$$P_{i,j,k} = S_m, \text{ where } m = i \times W + j + k \times W \times H \quad \text{[Equation 3]}$$

FIG. 7 illustrates an example in which a predetermined pixel sorting ranking is an order of the RGB channel, the row index, and the RGB channel. In this case, the homomorphic encryption-based image encryption and decryption system 1000 may allocate the pixels to encryption slots along the RGB channel, and then allocate the pixels to the plurality of encryption slots 620 along the RGB channel again while sequentially changing the row index and the column index.

Specifically, when the predetermined pixel sorting ranking is an order of the RGB channel, the row index, and the row index, the homomorphic encryption-based image encryption and decryption system 1000 may sequentially allocate, to a plurality of encryption slots 620, pixels corresponding to a specific row and a specific column while changing the RGB channel, and then sequentially allocate, to the plurality of encryption slots 620, pixels corresponding to a different column and a different row while changing the RGB channel again.

In some examples, the homomorphic encryption-based image encryption and decryption system 1000 may sequentially allocate pixels corresponding to a first row and a first column to the plurality of encryption slots while changing the RGB channel. Specifically, when the first row is a row with (i=0) and the first column is a row with (j=0), the homomorphic encryption-based image encryption and decryption system 1000 may sequentially allocate, to a plurality of encryption slots, '$P_{0,0,0}$' which is a pixel corresponding to the first row and the first column in a RED channel image 210, '$P_{0,0,1}$' which is a pixel corresponding to the first row and the first column in a BLUE channel image 220, and '$P_{0,0,2}$' which is a pixel corresponding to the first row and the first column in a GREEN channel image 230 while changing the RGB channel.

When allocation for the pixels for the first row and the first column is completed in all RGB channel images, the homomorphic encryption-based image encryption and decryption system 1000 may allocate, to the plurality of encryption slots 620, pixels corresponding to a second row different from the first row, and the first column while changing the RGB channel. Referring to FIG. 7, after allocating, to the plurality of encryption slots, '$P_{0,0,2}$' which is a pixel corresponding to the first row and the first column in the GREEN channel image 230, the homomorphic encryption-based image encryption and decryption system 1000 may sequentially allocate, to the plurality of encryption slots 620, '$P_{1,0,0}$' which is a pixel corresponding to the second row and the first column in the RED channel image 210, '$P_{1,0,1}$' which is a pixel corresponding to the second row and the first column in the BLUE channel image 220, and '$P_{0,0,2}$' which is a pixel corresponding to the second row and the first column in the GREEN channel image 230.

After allocating, to the plurality of encryption slots 620, '$P_{H-1,0,2}$' which is a pixel corresponding to a last row and the first column in the GREEN channel image 230 by such a scheme, the homomorphic encryption-based image encryption and decryption system 1000 may allocate, to the plurality of encryption slots 620, pixels corresponding to the first row and a second column different from the first column while changing the RGB channel. Referring to FIG. 7, after allocating, to the plurality of encryption slots 620, '$P_{H-1,0,2}$' which is a pixel corresponding to the first row and the first column in the GREEN channel image 230, the homomorphic encryption-based image encryption and decryption system 1000 may sequentially allocate, to the plurality of encryption slots 620, '$P_{0,1,0}$' which is a pixel corresponding to the first row and the second column in the RED channel image 210, '$P_{0,1,1}$' which is a pixel corresponding to the first row and the second column in the BLUE channel image 220, and '$P_{0,1,2}$' which is a pixel corresponding to the first row and the second column in the GREEN channel image 230. By such a scheme, the homomorphic encryption-based image encryption and decryption system 1000 may repeat the steps until allocation for a last pixel '$P_{H-1,W-1,C-1}$' is sequentially completed according to the pixel sorting ranking which is an order of the RGB channel, the row index, and the column index.

Pixel locations and pixel values of the pixels allocated according to the pixel sorting ranking information which is the order of the RGB channel, the row index, and the column index described in FIG. 7 are expressed as in the following equation.

$$P_{i,j,k} = S_m, \text{ where } m = i \times C + j \times H \times C + k \quad \text{[Equation 4]}$$

Figure 8:
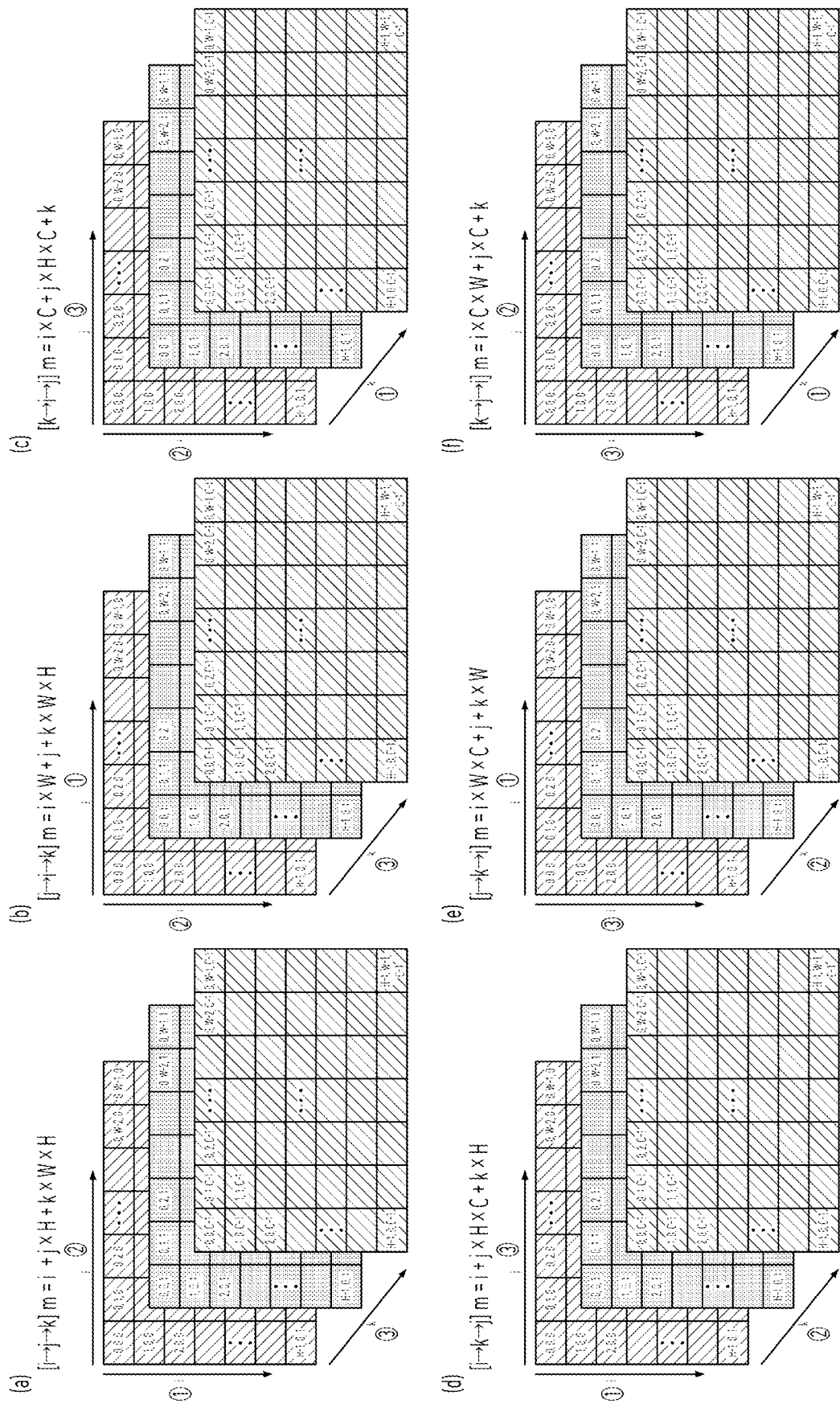
FIG. 8 is a diagram for describing various exemplary embodiments for a pixel sorting ranking determined by using a row index, a column index, and an RGB channel of pixel.

FIG. 8 is a diagram for describing various exemplary embodiments for a pixel sorting ranking determined by using a row index, a column index, and an RGB channel of pixel.

Referring to FIG. 8, an order of allocating the pixels according to various pixel sorting rankings including the exemplary embodiments described with reference to FIGS. 5 to 7 is illustrated. As described above, 'm' may represent an order in which the pixels are allocated according to the pixel sorting ranking. As illustrated in FIG. 8, 'm' may be determined by an equation constituted by a row 'i' and column 'j' indicating a pixel location according to each pixel sorting ranking, the RGB channel 'k', an image width 'W', an image height 'H', and the number of RGB channels, 'C'. 'm' may also be used to restore pixels to an original location on the image in a decryption process.

Figure 9:
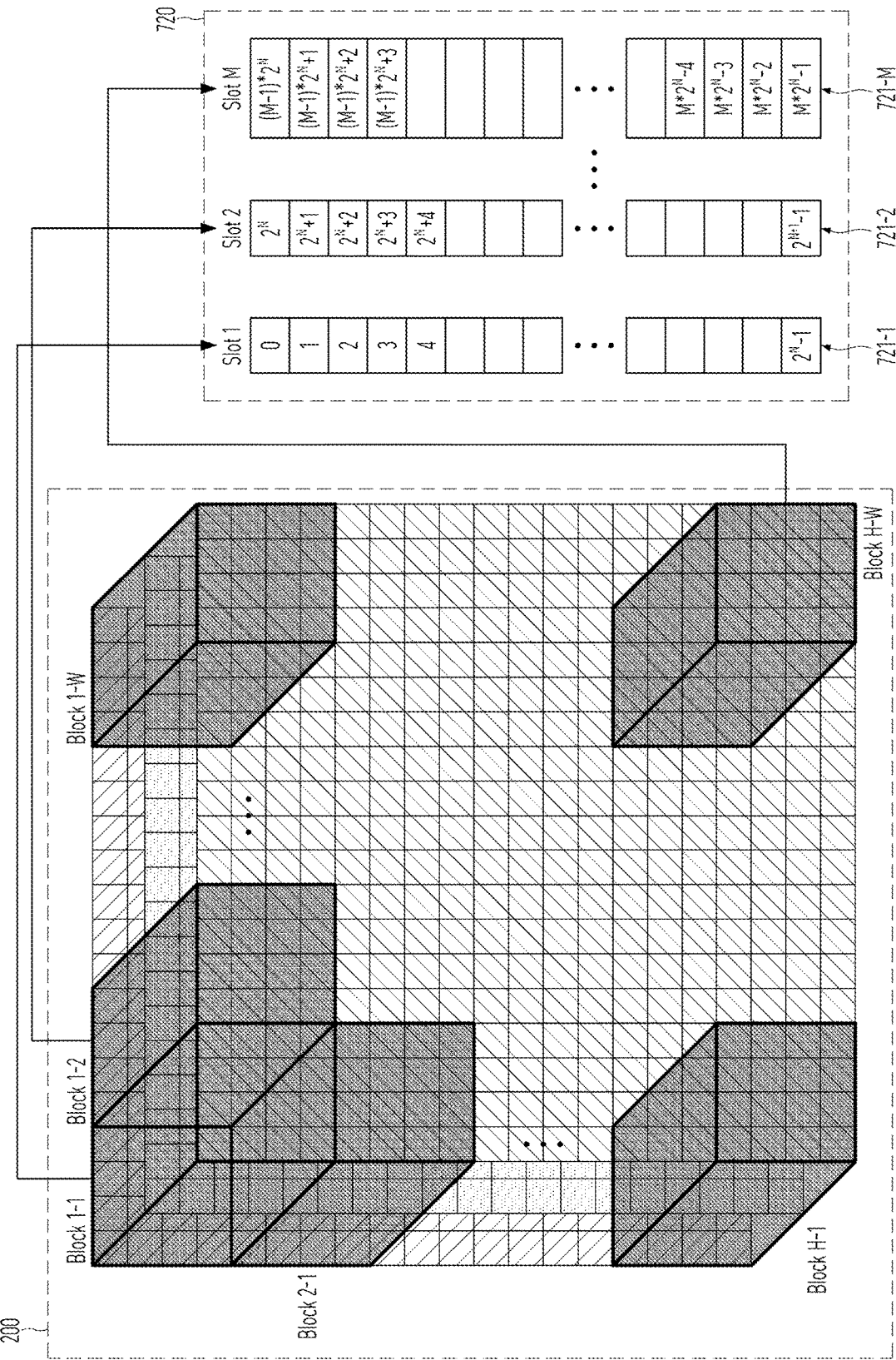
FIG. 9 is a diagram for describing an exemplary embodiment of allocating pixels of an image to a plurality of encryption slots according to a pixel sorting ranking in units of a block.

FIG. 9 is a diagram for describing an exemplary embodiment of allocating pixels of an image to a plurality of encryption slots according to a pixel sorting ranking in units of a block.

Referring to FIG. 9, the homomorphic encryption-based image encryption and decryption system 1000 may divide image data 200 into a plurality of blocks having a predetermined size. In this case, the homomorphic encryption-based image encryption and decryption system 1000 may perform homomorphic encryption for the image data 200 by a scheme of allocating pixels to a plurality of encryption slots 720 in units of a block. In this case, a pixel sorting ranking for an image including a block having a predetermined size may be determined by using a block sorting order, a row index, a column index, and an RGB channel of the pixel. In other words, when dividing and processing the image data 200 into a plurality of blocks, the homomorphic encryption-based image encryption and decryption system 1000 may perform homomorphic encryption and decryption by additionally utilizing an order in which blocks are sorted in the image. That is, when the pixel sorting ranking information includes a block sorting order indicating in which order the plurality of blocks are sorted in the image, the homomorphic encryption-based image encryption and decryption system 1000 may allocate the pixels to the plurality of encryption slots 720 in units of the block by using the block sorting order. Further, the homomorphic encryption-based image encryption and decryption system 1000 may restore the image by using decrypted pixel values in units of the block by using the block sorting order. In some examples, the homomorphic encryption-based image encryption and decryption system 1000 may allocate pixels values of a pixel group included in one block to one encryption slot 720, but is not limited thereto.

Figure 10:
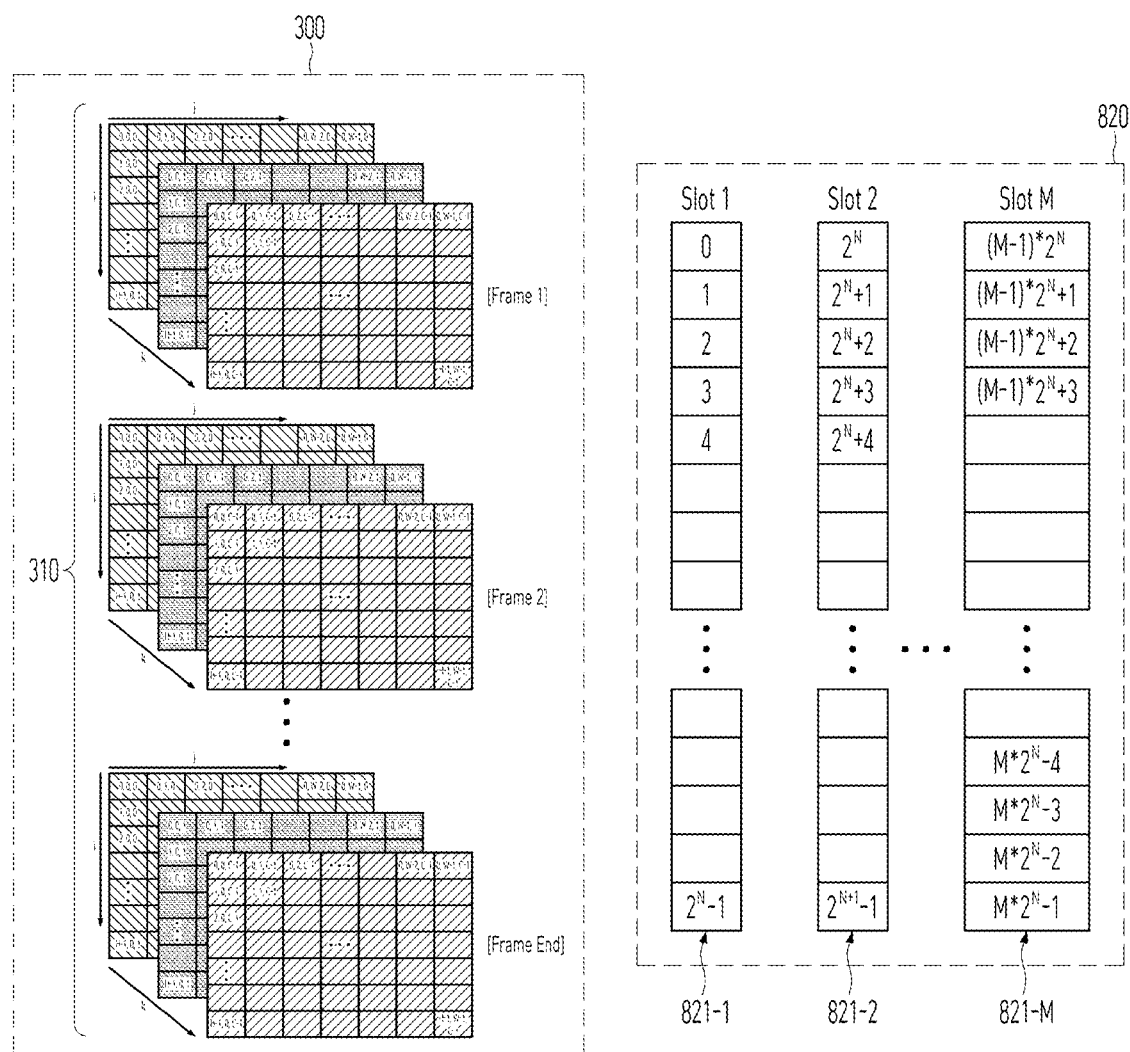
FIG. 10 is a diagram for describing an exemplary embodiment of allocating a video to a plurality of encryption slots according to a pixel sorting ranking.

FIG. 10 is a diagram for describing an exemplary embodiment of allocating a video to a plurality of encryption slots according to a pixel sorting ranking.

The homomorphic encryption-based image encryption and decryption system 1000 may be used to perform homomorphic encryption and decryption for video data. Specifically, the homomorphic encryption-based image encryption and decryption system 1000 may perform the homomorphic encryption and decryption by a scheme of processing each frame of the video data into one image.

Specifically, the homomorphic encryption-based image encryption and decryption system 1000 may allocate, to a plurality of encryption slots 820, a plurality of pixels included in a first frame of a video according to a predetermined pixel sorting ranking. The homomorphic encryption-based image encryption and decryption system 1000 may allocate, to the plurality of encryption slots 820, a plurality of pixels included in a second frame of the video according to the predetermined pixel sorting ranking. Similarly to the exemplary embodiment of homomorphically encrypting the image, the predetermined pixel sorting ranking may be determined by using a row index, a column index, and an RGB channel. Alternatively, when only some of all frames of the video data are encrypted, the predetermined pixel sorting ranking may further include frame information for a frame order (or a frame interval). When pixel allocation is completed wholly or partially, similarly to the exemplary embodiment of homomorphically encrypting the image, the homomorphic encryption-based image encryption and decryption system 1000 may perform the homomorphic encryption for pixel values for the pixel group allocated to each of the plurality of encryption slots 820. A process of decrypting the video data may be similar to the exemplary embodiment for the image.

Figure 11:
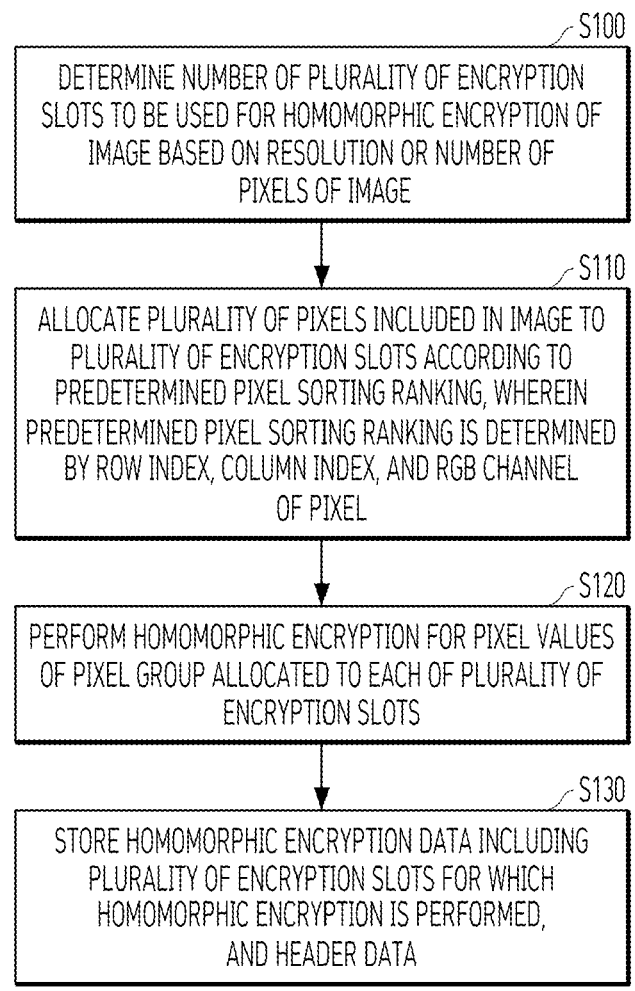
FIG. 11 is a flowchart of a homomorphic encryption-based image encryption method according to some exemplary embodiments of the present disclosure.

FIG. 11 is a flowchart of a homomorphic encryption-based image encryption method according to some exemplary embodiments of the present disclosure.

According to some exemplary embodiments of the present disclosure, the homomorphic encryption-based image encryption method may include step S100 of determining the number of plurality of encryption slots to be used for homomorphic encryption of an image based on a resolution or the number of pixels of the image.

According to some exemplary embodiments of the present disclosure, the homomorphic encryption-based image encryption method may include step S110 of allocating a plurality of pixels included in the image to the plurality of encryption slots according to a predetermined pixel sorting ranking. The predetermined pixel sorting ranking may be determined by using a row index, a column index, and an RGB channel of the pixel.

According to some exemplary embodiments of the present disclosure, the homomorphic encryption-based image encryption method may include step S120 of performing homomorphic encryption for pixel values of a pixel group allocated to each of the plurality of encryption slots.

According to some exemplary embodiments of the present disclosure, the homomorphic encryption-based image encryption method may include step S130 of storing homomorphic encryption data including the plurality of encryption slots for which the homomorphic encryption is performed, and header data.

The steps of the homomorphic encryption-based image encryption method according to some exemplary embodiments of the present disclosure described above are presented just for description, and some steps may be omitted or separate steps may be added. Further, the steps may be performed according to an arbitrary order.

Figure 12:
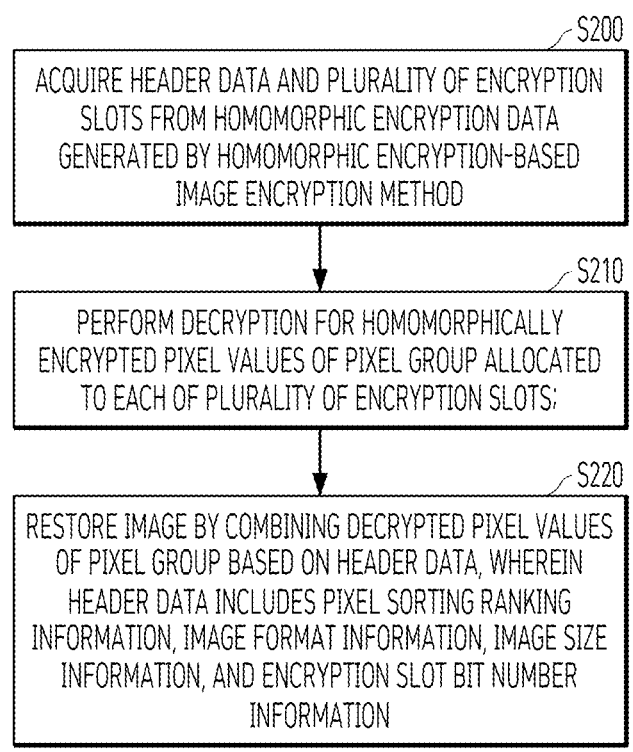
FIG. 12 is a flowchart of a homomorphic encryption-based image decryption method according to some exemplary embodiments of the present disclosure.

FIG. 12 is a flowchart of a homomorphic encryption-based image decryption method according to some exemplary embodiments of the present disclosure.

According to some exemplary embodiments of the present disclosure, the homomorphic encryption-based image decryption method may include step S200 of acquiring header data and a plurality of encryption slots from homomorphic encryption data generated by a homomorphic encryption-based image encryption method.

According to some exemplary embodiments of the present disclosure, the homomorphic encryption-based image decryption method may include step S210 of performing decryption for the homomorphically encrypted pixel values of a pixel group allocated to each of the plurality of encryption slots.

According to some exemplary embodiments of the present disclosure, the homomorphic encryption-based image decryption method may include step S220 of restoring an image by combining the decrypted pixel values of the pixel group based on the header data. Here, the header data may include pixel sorting ranking information, image format information, image size information, and encryption slot bit number information.

The steps of the homomorphic encryption-based image decryption method according to some exemplary embodiments of the present disclosure described above are presented just for description, and some steps may be omitted or separate steps may be added. Further, the steps may be performed according to an arbitrary order.

Figure 13:
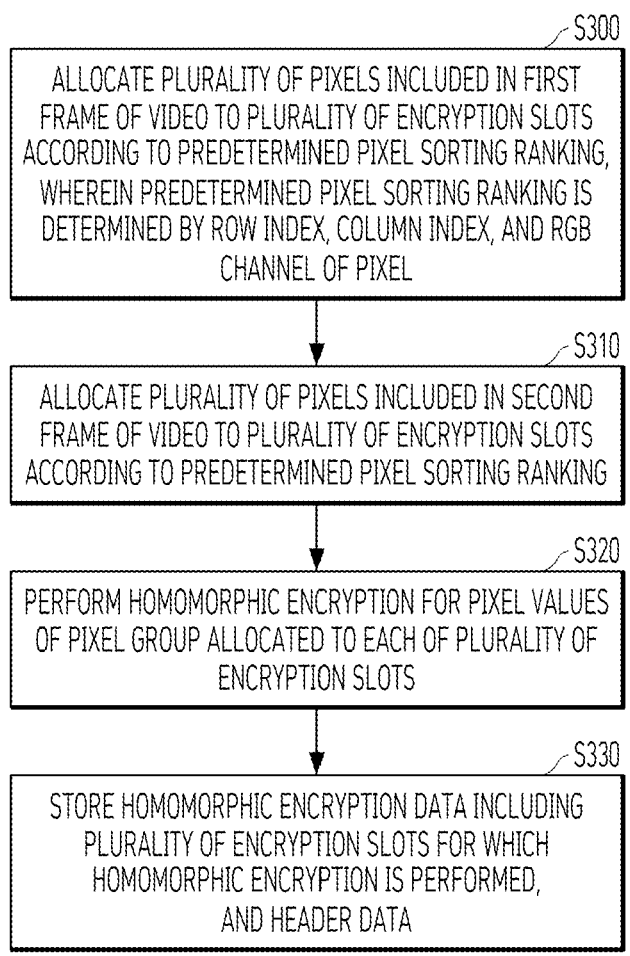
FIG. 13 is a flowchart of a homomorphic encryption-based video encryption method according to some exemplary embodiments of the present disclosure.

FIG. 13 is a flowchart of a homomorphic encryption-based video encryption method according to some exemplary embodiments of the present disclosure.

According to some exemplary embodiments of the present disclosure, the homomorphic encryption-based video encryption method may include step S300 of allocating a plurality of pixels included in a first frame of a video to a plurality of encryption slots according to a predetermined pixel sorting ranking. Here, the predetermined pixel sorting ranking may be determined by using a row index, a column index, and an RGB channel.

According to some exemplary embodiments of the present disclosure, the homomorphic encryption-based video encryption method may include step S310 of allocating a plurality of pixels included in a second frame of the video to the plurality of encryption slots according to the predetermined pixel sorting ranking.

According to some exemplary embodiments of the present disclosure, the homomorphic encryption-based video encryption method may include step S320 of performing homomorphic encryption for pixel values of a pixel group allocated to each of the plurality of encryption slots.

According to some exemplary embodiments of the present disclosure, the homomorphic encryption-based video encryption method may include step S330 of storing homomorphic encryption data including the plurality of encryption slots for which the homomorphic encryption is performed, and header data.

The steps of the homomorphic encryption-based video encryption method according to some exemplary embodiments of the present disclosure described above are presented just for description, and some steps may be omitted or separate steps may be added. Further, the steps may be performed according to an arbitrary order.

Figure 14:
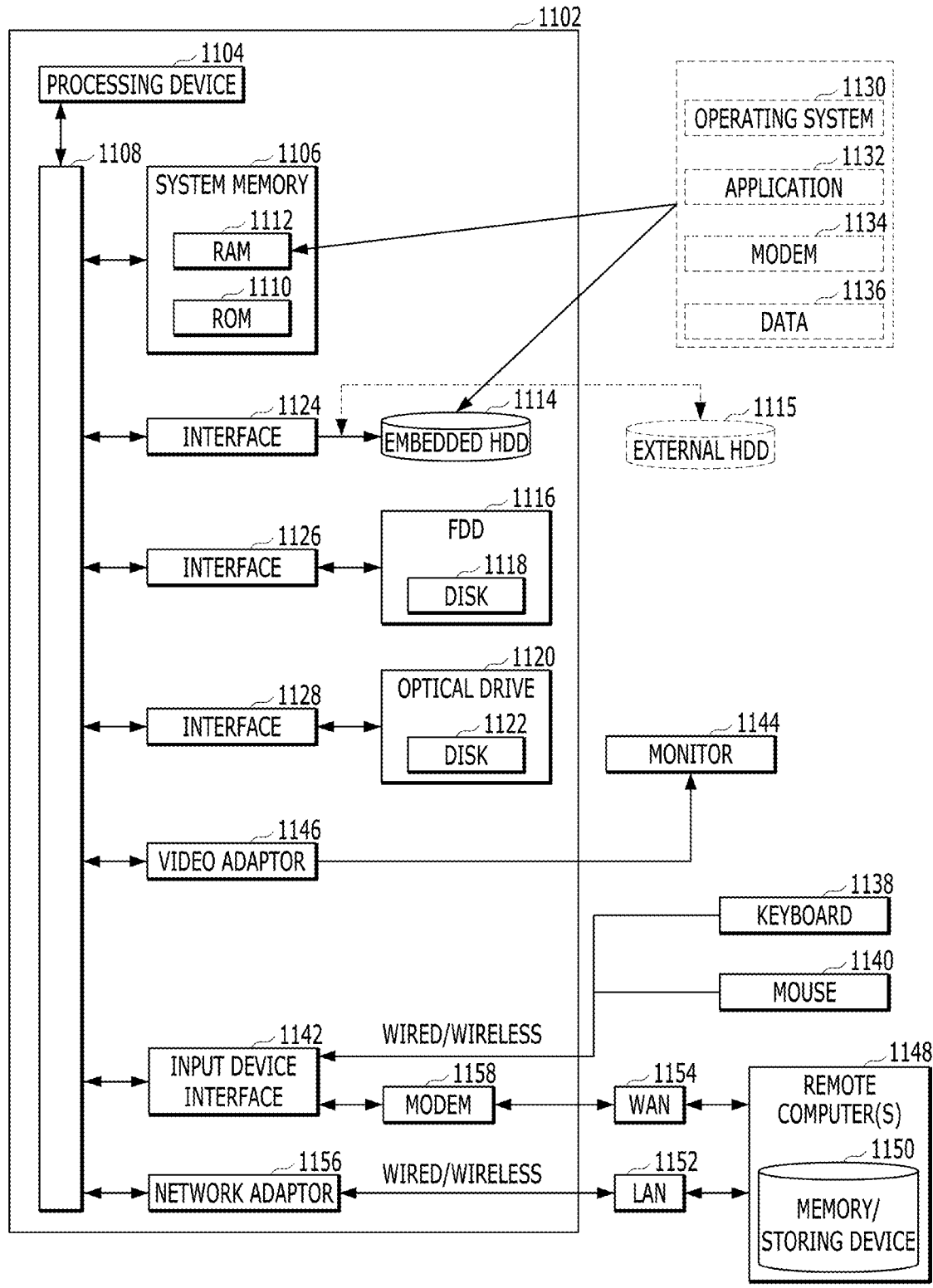
FIG. 14 illustrates a simple and general schematic view of an exemplary computing environment in which some exemplary embodiments of the present disclosure may be implemented.

FIG. 14 illustrates a simple and general schematic view of an exemplary computing environment in which some exemplary embodiments of the present disclosure may be implemented.

It is described above that the present disclosure may be generally implemented by the computing device, but those skilled in the art will well know that the present disclosure may be implemented in association with a computer executable instruction and/other program modules which may be executed on one or more computers and/or as a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting.

The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical disk drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer (s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as the Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as software), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various exemplary embodiments presented herein may be implemented as manufactured articles using a method, a device, or a standard programming and/or engineering technique. The term manufactured article includes a computer program, a carrier, or a medium which is accessible by a predetermined computer-readable storage device. For example, a computer-readable storage includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be analyzed within the widest range which is coherent with the principles and new features presented herein.

What is claimed is:

1. A homomorphic encryption-based image encryption method comprising:
    allocating a plurality of pixels included in an image to a plurality of encryption slots according to a predetermined pixel sorting ranking, wherein the predetermined pixel sorting ranking is determined by a row index, a column index, and an RGB channel of a pixel; and
    performing homomorphic encryption for pixel values of a pixel group allocated to each of the plurality of encryption slots;

acquiring header data and the plurality of encryption slots from homomorphic encryption data generated by the homomorphic encryption;

performing decryption for the pixel values of the pixel group allocated to each of the plurality of encryption slots; and restoring the image by combining the decrypted pixel values of the pixel group based on the header data, wherein the header data includes pixel sorting ranking information, image format information, image size information, and encryption slot bit number information, and wherein the step of restoring is performed in parallel for two or more of the encryption slots.

2. The homomorphic encryption-based image encryption method of claim 1, wherein the sequentially allocating of the plurality of pixels included in the image to the plurality of encryption slots according to the predetermined pixel sorting ranking includes sequentially allocating a plurality of pixels corresponding to a first row index and a first RGB channel to the plurality of encryption slots along the first row index, sequentially allocating a plurality of pixels corresponding to a second row index different from the first row index and the first RGB channel to the plurality of encryption slots along the second row index, and sequentially allocating a plurality of pixels corresponding to the first row index and a second RGB channel different from the first RGB channel to the plurality of encryption slots along the first row index.

3. The homomorphic encryption-based image encryption method of claim 1, wherein the allocating of the plurality of pixels included in the image to the plurality of encryption slots according to the predetermined pixel sorting ranking includes allocating a plurality of pixels corresponding to a first column index and the first RGB channel to the plurality of encryption slots along the first column index, allocating a plurality of pixels corresponding to a second column index different from the first column index and the first RGB channel to the plurality of encryption slots along the second column index, and allocating a plurality of pixels corresponding to the first column index and a second RGB channel different from the first RGB channel to the plurality of encryption slots along the first column index.

4. The homomorphic encryption-based image encryption method of claim 1, wherein the allocating of the plurality of pixels included in the image to the plurality of encryption slots according to the predetermined pixel sorting ranking includes sequentially allocating pixels corresponding to a first row and a first column to the plurality of encryption slots while changing an RGB channel, allocating pixels corresponding to a second row different from the first row and the first column to the plurality of encryption slots while changing the RGB channel, and allocating pixels corresponding to the first row and a second column different from the first column to the plurality of encryption slots while changing the RGB channel.

5. The homomorphic encryption-based image encryption method of claim 1, wherein the predetermined pixel sorting ranking for an image including a block having a predetermined size is determined by using a block sorting order, a row index, a column index, and an RGB channel of a pixel.

6. The homomorphic encryption-based image encryption method of claim 1, further comprising:

storing homomorphic encryption data including the plurality of encryption slots for which the homomorphic encryption is performed, and header data.

7. The homomorphic encryption-based image encryption method of claim 6, wherein the header data includes pixel sorting ranking information, image format information, image size information, and encryption slot bit number information.

8. The homomorphic encryption-based image encryption method of claim 1, wherein the performing of the homomorphic encryption for the pixel values of the pixel group allocated to each of the plurality of encryption slots includes performing a homomorphic encryption operation for pixel values of the pixel group allocated to two or more encryption slots in parallel.

9. The homomorphic encryption-based image encryption method of claim 1, further comprising:

determining the number of plurality of encryption slots to be used for the homomorphic encryption of the image based on a resolution or the number of pixels of the image.

10. A homomorphic encryption-based video encryption method comprising:

allocating a plurality of pixels included in a first frame of a video to a plurality of encryption slots according to a predetermined pixel sorting ranking, wherein the predetermined pixel sorting ranking is determined by a row index, a column index, and an RGB channel;

allocating a plurality of pixels included in a second frame of the video to the plurality of encryption slots according to the predetermined pixel sorting ranking;

performing homomorphic encryption for pixel values of a pixel group allocated to each of the plurality of encryption slots;

acquiring header data and the plurality of encryption slots from homomorphic encryption data generated by the homomorphic encryption;

performing decryption for the pixel values of the pixel group allocated to each of the plurality of encryption slots; and restoring the image by combining the decrypted pixel values of the pixel group based on the header data, wherein the header data includes pixel sorting ranking information, image format information, image size information, and encryption slot bit number information, and wherein the step of restoring is performed in parallel for two or more of the encryption slots.

11. A non-transitory computer readable medium storing a computer program, wherein the computer program includes instructions for causing one or more processors to perform a homomorphic encryption-based image encryption method, the method comprising:

allocating a plurality of pixels included in an image to a plurality of encryption slots according to a predetermined pixel sorting ranking, wherein the predetermined pixel sorting ranking is determined by a row index, a column index, and an RGB channel of a pixel;

performing homomorphic encryption for pixel values of a pixel group allocated to each of the plurality of encryption slots;

acquiring header data and the plurality of encryption slots from homomorphic encryption data generated by the homomorphic encryption;

performing decryption for the pixel values of the pixel group allocated to each of the plurality of encryption slots; and restoring the image by combining the decrypted pixel values of the pixel group based on the header data, wherein the header data includes pixel sorting ranking information, image format information, image size information, and encryption slot bit number information, and wherein the step of restoring is performed in parallel for two or more of the encryption slots.

12. A computing device performing a homomorphic encryption-based image encryption method, the computing device comprising:

a memory including computer-executable components; and a processor executing following computer-executable components stored in the memory, wherein the processor is configured to allocate a plurality of pixels included in an image to a plurality of encryption slots according to a predetermined pixel sorting ranking, wherein the predetermined pixel sorting ranking is determined by a row index, a column index, and an RGB channel of a pixel, perform homomorphic encryption for pixel values of a pixel group allocated to each of the plurality of encryption slots;

acquire header data and the plurality of encryption slots from homomorphic encryption data generated by the homomorphic encryption;

perform decryption for the pixel values of the pixel group allocated to each of the plurality of encryption slots; and restore the image by combining the decrypted pixel values of the pixel group based on the header data, wherein the header data includes pixel sorting ranking information, image format information, image size information, and encryption slot bit number information, and wherein restoring the image is performed in parallel for two or more of the encryption slots.

* * * * *